United States Patent Office 2,858,280
Patented Oct. 28, 1958

2,858,280

PROCESS FOR THE PREPARATION OF ESSENTIALLY ANHYDROUS PASTES OF ORGANIC PEROXIDES

Pieter R. A. Maltha, Deventer, Netherlands, assignor to Koninklijke Industrieele Maatschappij Voorbeen Noury & Van der Lande N. V., Deventer, Netherlands, a Dutch company No Drawing. Application September 29, 1953
Serial No. 383,138

7 Claims. (Cl. 252—426)

The invention relates to a process for the preparation of almost anhydrous pastes of organic peroxides. Under organic peroxides are included benzoyl peroxide, p-chlorobenzoyl peroxide, 2,4-dichlorobenzoyl-peroxide, cyclohexanone hydroperoxide and other like organic per compounds.

These organic peroxides may be employed as polymerisation catalysts in the manufacture of various types of synthetic resins or plastics. Benzoyl peroxide has already been used in the form of a paste with a plasticizer which itself is suitable as a constituent of the synthetic resin or plastic to be prepared. Such pastes need to contain only little, if any, water. However, on being prepared, organic peroxides initially are extremely moist, having a moisture content of about 30%. Therefore, for the preparation of an almost anhydrous paste, such organic peroxides should be dried, but, as has repeatedly appeared in practice, drying of organic peroxides is an extremely dangerous process, because of the highly explosive nature of dry peroxides.

According to the present invention, a process for the preparation of an almost anhydrous paste comprising an organic peroxide and a plasticizer comprises kneading a moist organic peroxide with less than 40% of a plasticizer, calculated on the dry peroxide, to form a coherent mass and removing water separated out in said kneading. The kneading may be continued under reduced pressure and with gentle heating, so as to eliminate the last traces of water. Thereafter, the remainder of said plasticizer is kneaded in to give the paste the required concentration.

Preferably, the mass is maintained at a temperature of about 40° C. during the kneading process, by which the separation of water is enhanced. For this purpose use may be made of a double-walled kneading machine, having warm water circulating between the double walls thereof. Moreover, such method of heating is necessary if use is being made of plasticizers which are solid at ordinary temperature, such as triphenyl phosphate.

Among plasticizers which are effective for carrying out the invention may be mentioned dibutyl phthalate, tricresyl phosphate and triphenyl phosphate.

Most suprisingly, it has been found that the elimination of water from the moist organic peroxide may be effected in the most convenient way by making use initially of one-third of the quantity of plasticizer required for a 50% peroxide-plasticizer paste; on the other hand, when all of the required quantity of plasticizer is added at once, only a little water will separate out.

In order that the invention may be readily understood, an example illustrating one way of carrying the invention into effect is given below.

*Example*

30 kg. of moist benzoyl peroxide containing 33.3% of water, and 6.5 kg. of dibutyl phthalate were mixed together in a kneading machine equipped with a vertical kneader. The kneading machine was operated for about 15 minutes and was then stopped. It was found that the benzoyl peroxide had formed a coherent mass with the dibutyl phthalate, whereas almost the total quantity of water originally present in the peroxide had separated out, and such water was readily removed through an outlet tube in the lower part of the kneading machine. Thereafter, kneading was continued and a further 13.5 kg. of dibutyl phthalate was added to form the required paste. In this way, a fine, smooth paste was obtained with a water-content of only a few percent.

What is claimed is:

1. A process for the preparation of an essentially anhydrous paste consisting essentially of an organic peroxide and a plasticizer to be used as such in the manufacture of synthetic resins, which comprises the steps of kneading an initially moist organic peroxide obtained from a wet production process for organic peroxides with said plasticizer to form a coherent mass, and removing water separated out in said kneading step.

2. A process for the preparation of an essentially anhydrous paste consisting essentially of an organic peroxide and a plasticizer to be used as such in the manufacture of synthetic resins which comprises the steps of first kneading an initially moist organic peroxide obtained from a wet production process for organic peroxides with not more than 40% of said plasticizer calculated on the dry peroxide, removing water separated out in said first kneading step and kneading in the remainder of said plasticizer to form a coherent mass.

3. A process for the preparation of an essentially anhydrous paste consisting essentially of an organic peroxide and a plasticizer to be used as such in the manufacture of synthetic resins, which comprises the steps of kneading an initially moist organic peroxide obtained from a wet production process for organic peroxides with said plasticizer to form a coherent mass, the temperature of said mass being maintained at about 40° C. during said kneading step, and removing water separated out in said kneading step.

4. A process for the preparation of an essentially anhydrous paste consisting essentially of an organic peroxide and a plasticizer to be used as such in the manufacture of synthetic resins which comprises the steps of first kneading an initially moist organic peroxide obtained from a wet production process for organic peroxides with not more than 40% of said plasticizer calculated on the dry peroxide, the temperature of said peroxide and plasticizer being maintained at about 40° C., removing water separated out in said first kneading step, subsequently continuing kneading under reduced pressure while maintaining said temperature at about 40° C. so as to eliminate the last traces of water, and thereafter kneading in the remainder of said plasticizer.

5. A process for the preparation of an essentially anhydrous paste consisting essentially of an organic peroxide and a plasticizer to be used as such in the manufacture of synthetic resins, which comprises the steps of kneading an initially moist organic peroxide obtained from a wet production process for organic peroxides selected from the group consisting of benzoyl peroxide, p-chlorobenzoyl peroxide, 2,4-dichlorobenzoyl peroxide and cyclohexanone hydroperoxide with said plasticizer to form a coherent mass, and removing water separated out in said kneading step.

6. A process for the preparation of an essentially anhydrous paste consisting essentially of an organic peroxide and a plasticizer to be used as such in the manufacture of synthetic resins, which comprises the steps of kneading an initially moist organic peroxide obtained from a wet production process for organic peroxides selected from the group consisting of benzoyl peroxide, p-chlorobenzoyl peroxide, 2,4-dichlorobenzoyl peroxide and cyclohexanone hydroperoxide with said plasticizer selected from the group consisting of dibutyl phthalate, tricresyl phosphate and triphenyl phosphate to form a coherent mass and removing water separated out in said kneading step.

7. A process for the preparation of an essentially anhydrous paste consisting essentially of an organic peroxide and a plasticizer selected from the group consisting of dibutyl phthalate, tricresyl phosphate and triphenyl phosphate, which comprises the steps of first kneading an initially moist organic peroxide selected from the group consisting of benzoyl peroxide, p-chlorobenzoyl peroxide, 2,4-dichlorobenzoyl peroxide and cyclohexanone hydroperoxide with not more than 40% of said plasticizer, the temperature of said peroxide and plasticizer being maintained at about 40° C., removing water separated out in said first kneading step, subsequently continuing kneading under reduced pressure while maintaining said temperature at about 40° C. so as to eliminate the last traces of water and thereafter kneading in the remainder of the total quantity of said plasticizer.

References Cited in the file of this patent

UNITED STATES PATENTS

| 2,549,732 | Weaver | Apr. 17, 1951 |
| 2,632,752 | Anderson | Mar. 24, 1953 |

FOREIGN PATENTS

| 522,868 | Belgium | Sept. 17, 1953 |